(12) United States Patent
Maurer et al.

(10) Patent No.: US 8,547,103 B2
(45) Date of Patent: Oct. 1, 2013

(54) MULTIPLE DEPTHS OF INVESTIGATION USING TWO TRANSMITTERS

(75) Inventors: Hans-Martin Maurer, Houston, TX (US); David R. Beard, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 200 days.

(21) Appl. No.: 13/042,047

(22) Filed: Mar. 7, 2011

(65) Prior Publication Data

US 2012/0081121 A1  Apr. 5, 2012

Related U.S. Application Data

(60) Provisional application No. 61/313,907, filed on Mar. 15, 2010, provisional application No. 61/379,647, filed on Sep. 2, 2010.

(51) Int. Cl.
*G01V 3/08* (2006.01)
(52) U.S. Cl.
USPC .............. 324/342; 324/343; 324/338
(58) Field of Classification Search
USPC ................................. 324/338–339
See application file for complete search history.

(56) References Cited

U.S. PATENT DOCUMENTS

| | | |
|---|---|---|
| 3,305,771 A | 2/1967 | Arps |
| 3,408,561 A | 10/1968 | Redwine et al. |
| 4,618,828 A | 10/1986 | Raynal |
| 5,045,795 A | 9/1991 | Gianzero et al. |
| 5,157,605 A * | 10/1992 | Chandler et al. ............ 702/7 |
| 5,235,285 A | 8/1993 | Clark et al. |
| 5,339,036 A | 8/1994 | Clark et al. |
| 5,339,037 A | 8/1994 | Bonner et al. |
| 5,389,881 A * | 2/1995 | Bittar et al. ............ 324/338 |
| 5,428,293 A | 6/1995 | Sinclair et al. |
| 5,463,320 A | 10/1995 | Bonner et al. |
| 5,892,361 A | 4/1999 | Meyer, Jr. et al. |
| 6,191,586 B1 * | 2/2001 | Bittar ............ 324/339 |
| 6,211,678 B1 | 4/2001 | Hagiwara |
| 6,359,438 B1 | 3/2002 | Bittar et al. |
| 6,777,940 B2 | 8/2004 | Macune |
| 2008/0040042 A1 | 2/2008 | Page |
| 2010/0156424 A1* | 6/2010 | Bittar et al. ............ 324/339 |

* cited by examiner

*Primary Examiner* — Jay Patidar
(74) *Attorney, Agent, or Firm* — Mossman Kumar & Tyler PC

(57) ABSTRACT

An apparatus and method for estimating a parameter of interest of an earth formation, particularly relating to borehole logging methods and apparatuses for estimating electrical resistivity properties at multiple depths of investigation. The apparatus may include two or more transmitters for introducing electrical current to the earth formation. The apparatus may include a controller configured to deliver an electrical signal to the two or more transmitters either simultaneously or sequentially. The controller may deliver an electrical signal to two or more transmitters at the same frequency for estimating depth of investigation. The apparatus may include one or more receivers responsive to electric signals from the earth formation at one or more frequencies to provide data from one or more depths of investigation. The method may include steps for using the apparatus to obtain data that may be used to estimate the parameter of interest.

19 Claims, 6 Drawing Sheets

| | T1 | | T3 | |
|---|---|---|---|---|
| f1 | 1.00 | | 0.00 | 715 |
| f2 | 0.48 | | 0.52 | 725 |
| f3 | 0.22 | | 0.78 | 735 |
| f4 | 0.08 | | 0.92 | 745 |
| f5 | 0.00 | | 1.00 | 755 |
| f6 | -0.05 | | 1.05 | 765 |

US 8,547,103 B2

MULTIPLE DEPTHS OF INVESTIGATION USING TWO TRANSMITTERS

CROSS-REFERENCES TO RELATED APPLICATIONS

This application claims priority from U.S. Provisional Patent Application Ser. No. 61/313,907, filed on 15 Mar. 2010, and U.S. Provisional Patent Application Ser. No. 61/379,647, filed on 2 Sep. 2010, the disclosures of which are incorporated herein by reference in their entirety.

FIELD OF THE DISCLOSURE

In one aspect, this disclosure generally relates to borehole logging methods and apparatuses for estimating at least one parameter of an earth formation. More particularly, this disclosure relates to estimating electrical resistivity properties of the earth formation using toroids.

BACKGROUND OF THE DISCLOSURE

Oil well logging has been known for many years and provides an oil and gas well driller with information about the particular earth formation being drilled. In conventional oil well logging an electric current signal may be imparted into the earth formation for the purpose of estimating the resistivity of the earth formation. The magnetic or electric current source(s) and receiver(s) sensitive to magnetic and/or electric signals may be conveyed into the borehole and used to determine one or more parameters of interest of the formation. A rigid or non-rigid carrier is often used to convey the magnetic or electric current source(s) and receiver(s), often as part of a tool or set of tools, and the carrier may also provide communication channels for sending information up to the surface.

SUMMARY OF THE DISCLOSURE

In aspects, the present disclosure is related to apparatuses and methods of estimating a parameter of interest of a formation using one or more transverse toroids to receive electric signals from an earth formation.

One embodiment according to the present disclosure is an apparatus for estimating a parameter of interest of an earth formation, comprising: a carrier; a primary transmitter on the carrier; and a receiver toroid on the carrier, the receiver toroid being positioned transversely on the carrier and including a single coil antenna.

Another embodiment according to the present disclosure is a method of estimating a parameter of interest of an earth formation comprising: positioning a logging tool in a borehole in the earth formation; using a transverse receiver toroid on a carrier on the logging tool, wherein the transverse receiver toroid includes a single coil antenna; and producing a signal responsive to an electrical signal produced by a primary transmitter.

Another embodiment according to the present disclosure is an apparatus for estimating a parameter of interest of an earth formation, comprising: a carrier; a first transmitter on the carrier; a second transmitter on the carrier; and a controller (125, FIG. 3) in electrical communication with the first transmitter and the second transmitter, the controller being: configured to deliver an electrical signal to the first transmitter at a first frequency for a first depth of investigation, configured to deliver an electrical signal to the second transmitter at a third frequency for a third depth of investigation, and configured to deliver electrical signals to the first transmitter and the second transmitter at a second frequency for the second depth of investigation.

Another embodiment according to the present disclosure is a method of estimating a parameter of interest of an earth formation comprising: estimating the parameter of interest using signals responsive to electrical signals produced by a first transmitter and a second transmitter for at least three different depths of investigation, wherein a first signal is produced by the first transmitter at a first frequency for a first depth of investigation, a third signal is produced by the second transmitter at a third frequency for a third depth of investigation, and a second signal is produced by the combination of the first transmitter and the second transmitter at a second frequency for a second depth of investigation.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
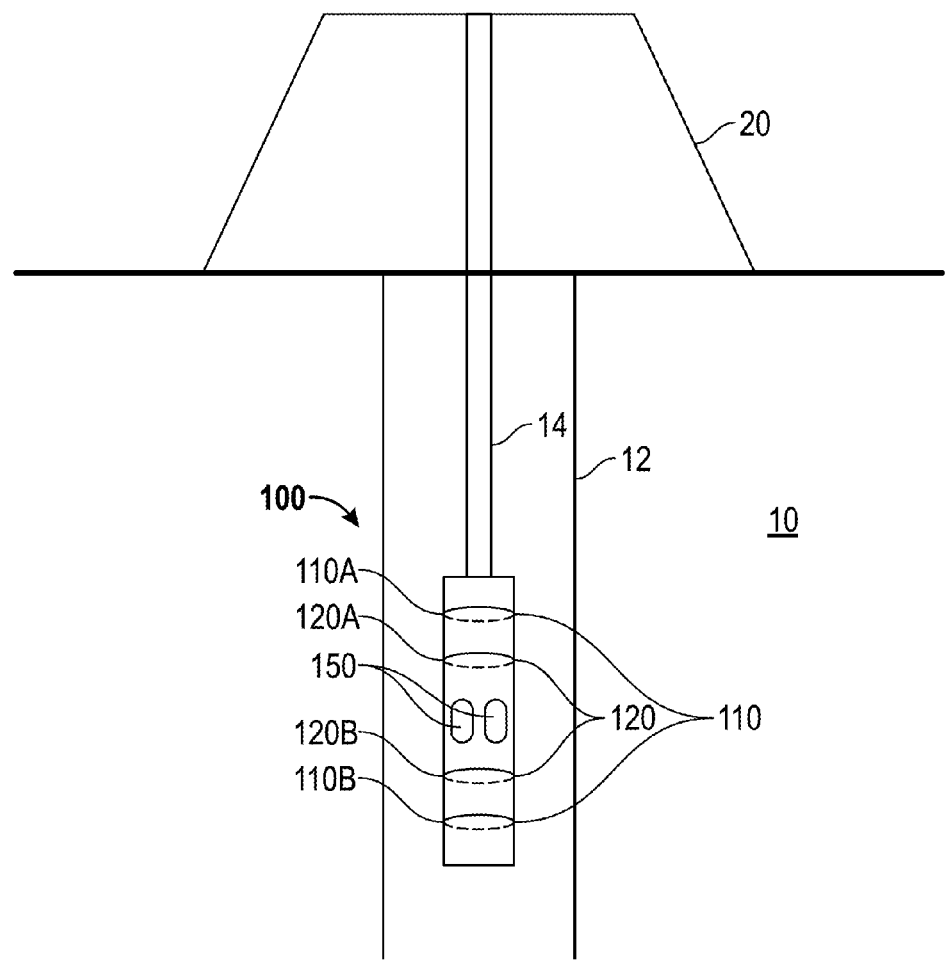
FIG. 1 shows a schematic of a downhole tool deployed in a wellbore along a drill string according to one embodiment of the present disclosure.

The present disclosure relates to borehole logging methods and apparatuses for estimating at least one parameter of interest of an earth formation. More particularly, this disclosure relates to estimating electrical resistivity properties of the earth formation using at least one transverse toroid.

In the toroid concept, a coil wound around a toroid core may act as a receiver of electric current. Toroids may be well suited for logging while drilling (LWD) applications because toroids do not require the electrical isolation of components of the drill collar. Herein, the toroid core refers to a magnetic core with sufficient permeability to be used to confine and guide magnetic fields, such as iron and other ferromagnetic compounds. A toroid may include a toroid core and at least one coil wound a substantial distance around the toroid core (more than 50%). A toroid core may be generally circular or polygonal (such as rectangular or semi-rectangular). A toroid core may be continuous or have an air gap present. As one of skill in the art will understand, the borehole environment may be hostile, especially during drilling. One advantage of toroids may be their robustness when exposed to a hostile drilling environment. Nonetheless, embodiments according to this disclosure may also be implemented in less hostile borehole environments such as on post-drilling wireline tools.

In some embodiments, multiple transmitter toroid pairs may operate at one frequency, where the toroid pairs may be energized separately. The amplitude, frequency, and distance of the toroids from a receiver may determine the depth of investigation of the apparatus. In some embodiments, transmitter toroid pairs may operate at two or more frequencies. In some embodiments, the transmitter toroid pairs may operate simultaneously. For example, if a first toroid pair simultaneously operates at frequency $f_1$ with amplitude $A_1$ and at frequency $f_2$ with amplitude $\frac{1}{2}A_2$, and a second toroid pair simultaneously operates at frequency $f_2$ with amplitude $\frac{1}{2}A_2$ and at frequency, $f_3$ with amplitude $A_3$, then the signals of frequencies $f_1$, $f_2$ and $f_3$ may be used to estimate electrical resistivity properties of the earth formation at three depth of investigation. Varying the proportion of amplitude $A_2$ in the two toroid pairs may provide depths of investigation along any points between the depths on investigation bracketed by the first toroid pair and the second toroid pair.

Hence, in a three toroid configuration, the middle toroid pair may be removed and substituted by combining two frequencies in the two other toroid pairs. The toroids pairs may be placed on the mandrel at a distance from each other to create the deepest and the shallowest depth of investigation desired. Any number of curves with a depth of investigation between the two extremes can be measured by driving the two transmitter pairs with a linear combination of the source signal without any additional hardware.

FIG. 1 schematically represents one embodiment according to the present disclosure wherein a subterranean formation 10 is intersected by a borehole 12. Suspended within the borehole 12 near the bottom end of a carrier 14, such as a drill string or wireline, is a downhole tool 100. The carrier 14 may be carried over a pulley (not shown) and/or supported by a derrick 20. The carrier 14 may be a drill string, coiled tubing, a slickline, an e-line, a wireline, etc. Downhole tool 100 may be coupled or combined with additional tools. In some embodiments, the borehole 12 may be utilized to recover hydrocarbons. In other embodiments, the borehole 12 may be used for geothermal applications or other uses.

Downhole tool 100 may include a primary (first) transmitter 110 and a secondary (second) transmitter 120. Each transmitter 110, 120 may include a pair of opposing toroids 110A, 110B, 120A, 120B. The use of two opposing toroid pairs as transmitters 110, 120 is illustrative and exemplary only, as embodiments according to the present disclosure may be implemented with non-toroidal transmitters, such as current electrodes, and embodiments may be implemented with only one transmitter electrode pair, one transmitter toroidal pair, or multiple electrode and/or toroidal transmitters. Downhole tool 100 may also include a receiver toroid 150. The receiver toroid 150 may be positioned along the downhole tool 100 such that the receiver toroid 150 is transverse or substantially transverse to the longitudinal axis of the downhole tool 100. The receiver toroid 150 may include a coil 155 (FIG. 2) that may partially or completely surround the receiver toroid 150. In some embodiments, the transmitter pairs 110, 120 may be positioned such that each transmitter toroid 110A, 110B, 120A, 120B of a transmitter pair 110, 120 may be equidistant from the receiver toroid 150.

In some embodiments, multiple receiver toroids 150 may be arrayed around the circumference of the downhole tool 100. In operation, the downhole tool 100 may positioned in borehole 12 in proximity to an earth formation 10. During drilling operations, the downhole tool 100 may travel along a segment of the borehole 12. Electric currents from the transmitters 110, 120 may penetrate the borehole wall 12. Interaction of the electric currents with formation 10 may produce responsive electric signals that may be detected by the receiver toroid 150. The electric signals may include electric currents and/or voltages. Typically, the electric signals are in the form of electric currents or electric voltages. These detected signals may be used to estimate at least one parameter of interest of the earth formation 10, such as resistivity properties. Herein, resistivity properties include, but are not limited to, resistance, conductivity, permittivity, and dielectric constant. Additional receiver toroids 150 may provide more extensive azimuthal coverage or improved resolution of the responsive electric signals than a single receiver toroid 150. Additionally, multiple receiver toroids 150 may provide continuous coverage in along multiple azimuthal directions during occasions where the drilling tool 100 slides within the borehole 12, whereas a single receiver toroid 150 would only provide coverage in a single direction.

In another embodiment, electrical current may be introduced into the earth formation 10 from electrodes (not shown). By providing a constant potential on the surface of downhole tool 100 over a desired length, electric current may be introduced into the formation and a responsive electric current return at the one or more receiver toroids 150. In this embodiment, the electrodes may need to be electrically isolated from the one or more receiver toroids 150 and from the tool body. Using pairs of electrodes and connecting voltage sources operating at different frequencies between the pairs, multiple depths of investigation may be achieved.

Figure 2:
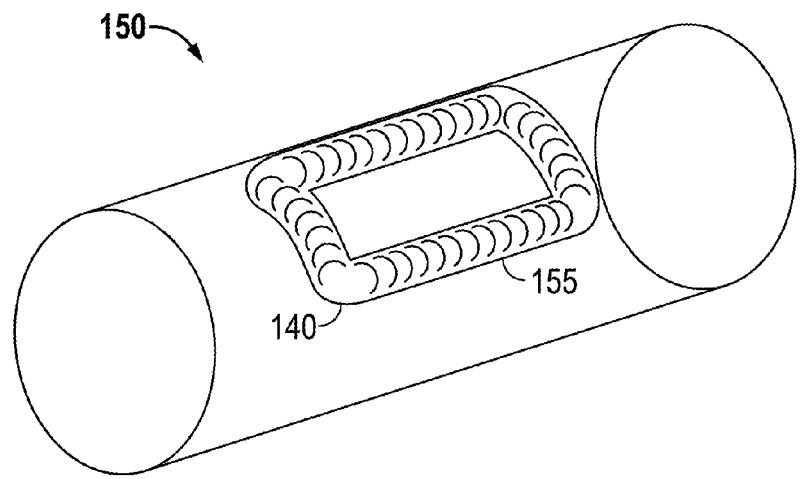
FIG. 2 shows a graphical illustration of a receiver toroid according to one embodiment according to the present disclosure.

FIG. 2 shows one embodiment, according to the present disclosure, of the receiver toroid 150, which includes coil 155 that partially surrounds a semi-rectangular core 140. The use of semi-rectangular core is illustrative and exemplary only, as other shapes may be used as desired. Unlike receiver toroids that may require multiple coils; embodiments according to this disclosure may be implemented with one or more coils. When a single coil arrangement is used, the receiver toroid 150 may have many of the properties of a closed loop antenna.

Figure 3A:
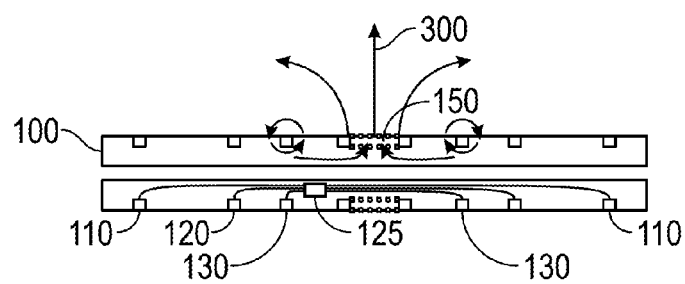
FIG. 3A graphically illustrates of the flow of current relative to the apparatus for the first depth of investigation according to one embodiment of the method according to the present disclosure.
Figure 3B:
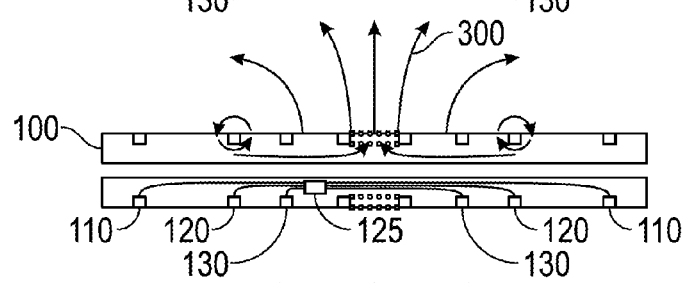
FIG. 3B graphically illustrates of the flow of current relative to the apparatus for the second depth of investigation.
Figure 3C:
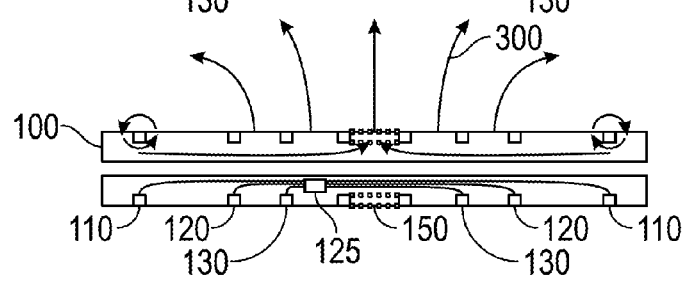
FIG. 3C graphically illustrates of the flow of current relative to the apparatus for the third depth of investigation.

FIGS. 3A-C shows one embodiment according to the present disclosure, wherein multiple transmitter toroid pairs 110, 120, 130 transmit electric currents 300 into a formation 10. The responsive electric signals from the formation 10 may be detected by the one or more receiver toroids 150 positioned within the multiple transmitter toroid pairs 110, 120, 130. The multiple transmitter toroid pairs 110, 120, 130 may be activated simultaneously or sequentially. Depth of investigation regarding the formation 10 may be controlled by altering the spacing of one or more of the transmitter pairs 110, 120, 130, thus, due to the different spacing of the multiple transmitter toroids 110, 120, 130, the electric currents 300 may penetrate the formation 10 to different depths simultaneously. A large distance between opposing toroids of a particular transmitter toroid pair may result in a large depth of investigation. The different electric currents 300 may be seen in FIGS. 3A-C, as FIG. 3A shows the electric current 300 produced when transmitter toroid pair 130 is energized; FIG. 3B shows the electric current 300 produced when transmitter toroid pair 120 is energized; and FIG. 3C shows the electric current 300 produced when transmitter toroid pair 110 is energized. The responsive electric signals received by the receiver toroids 150 may provide information regarding the resistivity properties of the formation 10 at different depths. The multiple transmitter toroids 110, 120, 130 may transmit signals sequentially at identical frequencies, which may allow the depth of investigation to be varied at a particular frequency at different times, or simultaneously at different frequencies, which may allow formation information to be gathered from multiple depths of investigation simultaneously.

Figure 4:
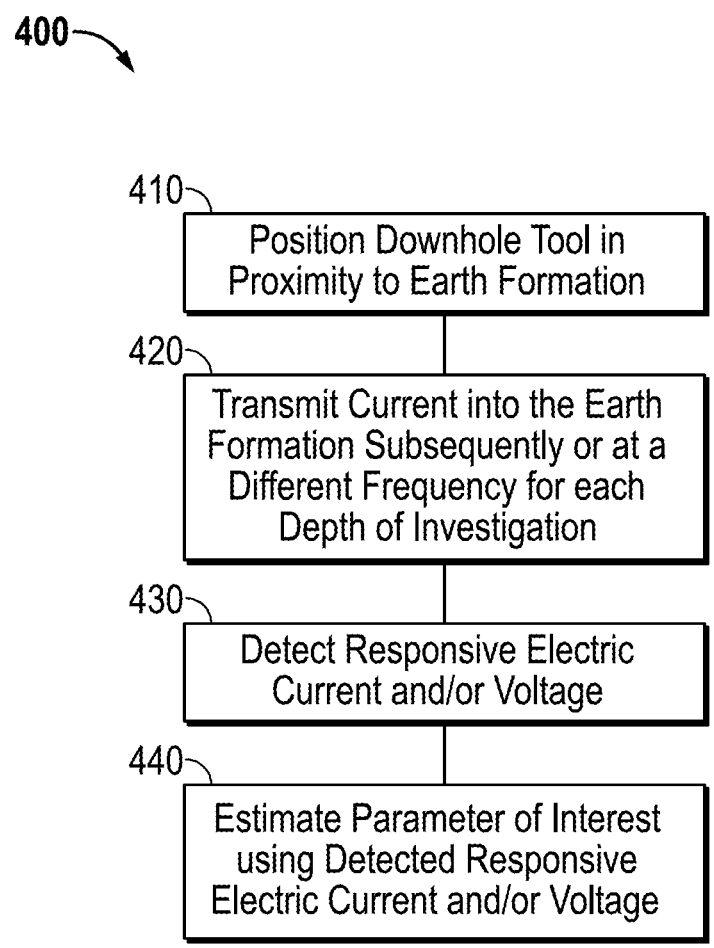
FIG. 4 shows a flow chart of an estimation method according to the present disclosure.

As shown in FIG. 4, method 400 is a method for estimating at least one parameter of interest of an earth formation. Method 400 may include step 410, where a downhole tool 100 may be positioned in a borehole 12 in proximity to an earth formation 10. In step 420, one or more transmitters 110, 120, 130 introduces an electric current into the earth formation 10 resulting a responsive electric signal due to interactions between the electric current and the earth formation 10. The electric currents may be introduced simultaneously at two or more frequencies or sequentially at one or more frequencies. In step 430, a transverse receiver toroid 150 detects the responsive electric signal from the earth formation 10. In step 440, a parameter of interest of the formation may be estimated using the detected electric signal.

Figure 5A:
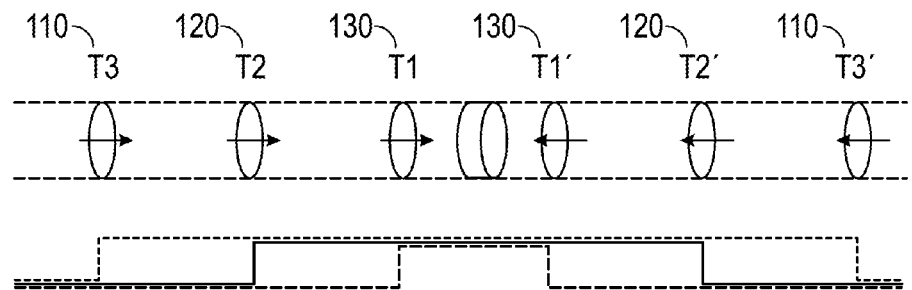
FIG. 5A shows a schematic of one embodiment according to the present disclosure using three transmitter toroid pairs and the corresponding potential distribution curves.
Figure 5B:
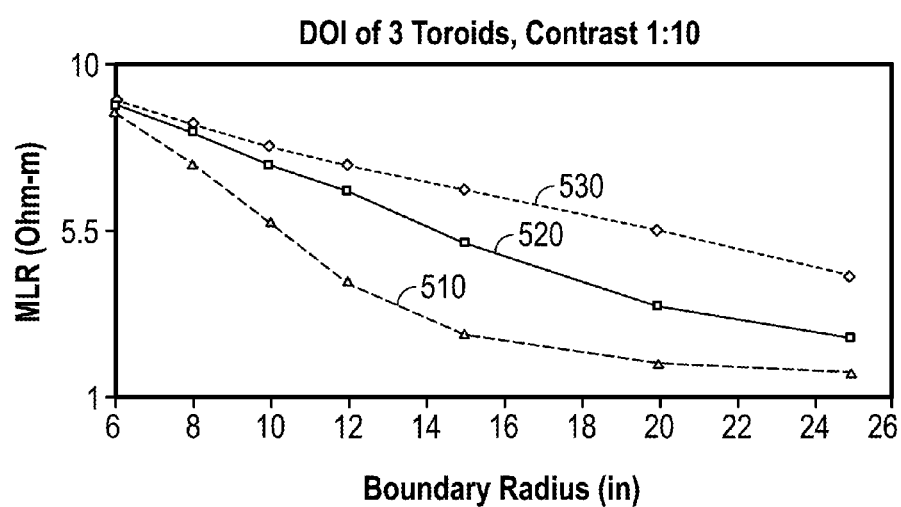
FIG. 5B graphically illustrates the pseudogeometric factor curves for the three depths of investigation using the embodiment of FIG. 5A.

FIG. 5A shows a schematic of one embodiment according to the present disclosure, wherein three transmitter toroid pairs 110, 120, 130 introduce an electric current at three different frequencies and a graph that illustrates the potential distribution. FIG. 5B is a graph that illustrates the pseudogeometrical factors 510, 520, 530 related to the depths of investigation provided by the three transmitter toroid pairs 110, 120, 130.

Figure 6A:
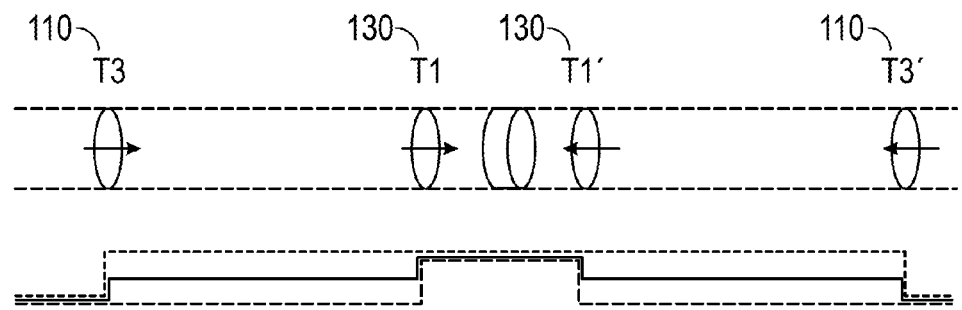
FIG. 6A shows a schematic of one embodiment according to the present disclosure using two transmitter toroid pairs and the corresponding potential distribution curves.
Figure 6B:
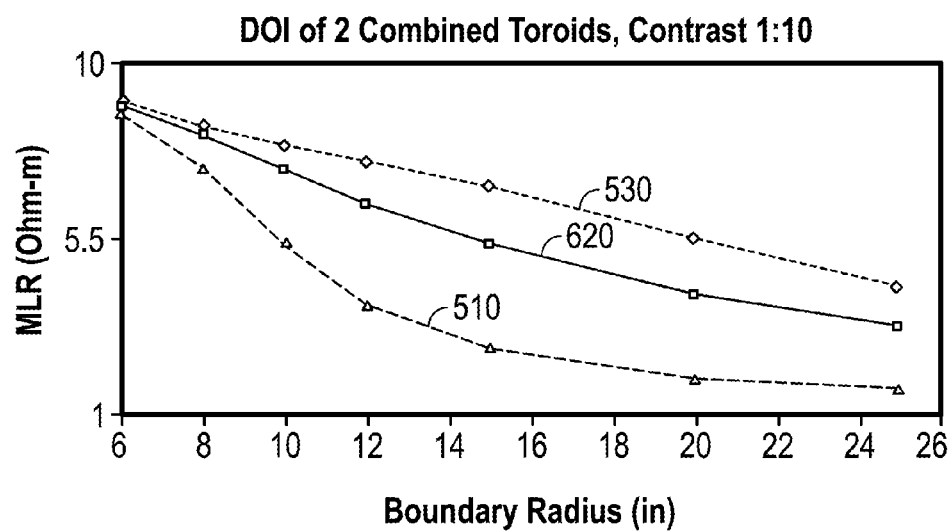
FIG. 6B graphically illustrates the pseudogeometric factor curves for the three depths of investigation using the embodiment of FIG. 6A.

FIG. 6A shows a schematic of another embodiment according to the present disclosure, wherein two outer transmitter toroid pairs 110, 130 are used to independently provide two depths of investigation and combined to achieve a third depth of investigation. It also shows the potential distribution of this embodiment. FIG. 6B is the corresponding graph of pseudogeometric factors that illustrates the two independent depths of investigation and 510, 530 and the combined depth of investigation 620. It may be apparent that the combination of the two outer transmitter toroid pairs realizes an intermediate depth of investigation 620 that is similar or exactly the same as the depth of investigation 520 realized by transmitter toroid pair 120.

Varying the amplitude of frequencies used by the outer transmitter toroids 110, 130 may realize any potential distribution for depths of investigation between the bounds of the outer transmitter toroids 110, 130, as may be seen in FIG. 7A, which corresponds with the FIG. 7B, when operating as follows:

$$f_n: \alpha_n * T_1 * \sin(\omega_n t) + (1-\alpha_n) * T_3 * \sin(\omega_n t) \quad (1)$$

where $f_n$ is the frequency for the desired depth of investigation, $\alpha_n$ is the amplitude contribution from the outer transmitter toroid pair, $\omega_n$ is the angular frequency used for the desired depth of investigation, $\alpha_n * T_1$ is amplitude of the outer transmitter toroid pair, and $(1-\alpha_n)*T_3$ is the amplitude of the inner transmitter toroid pair. By driving the two toroid pairs in a different ratio at different frequencies, a multitude of curves with different depth of investigation can be created. This is not software focusing, but instead, a unique potential distribution is created which results in an independent measurement. This does not mean that the information is independent, but it is a separate new measurement.

For example, if a 50% amplitude contribution is used for the outer T1 and inner T3 toroid pairs, then the formulas for the three depths of investigation from a two toroid system would be as follows:

$$f_1: 1.0*T_1*\sin(\omega_1 t)+0.0*T_3*\sin(\omega_1 t)$$

$$f_2: 0.5*T_1*\sin(\omega_2 t)+0.5*T_3*\sin(\omega_2 t)$$

$$f_3: 0.0*T_1*\sin(\omega_3 t)+1.0*T_3*\sin(\omega_3 t) \quad (2)$$

where the outer toroid pair operates at angular frequencies, $\omega_1$ and $\omega_2$, the inner toroid pair operates at angular frequencies $\omega_2$ and $\omega_3$.

Figures 7A, 7B:
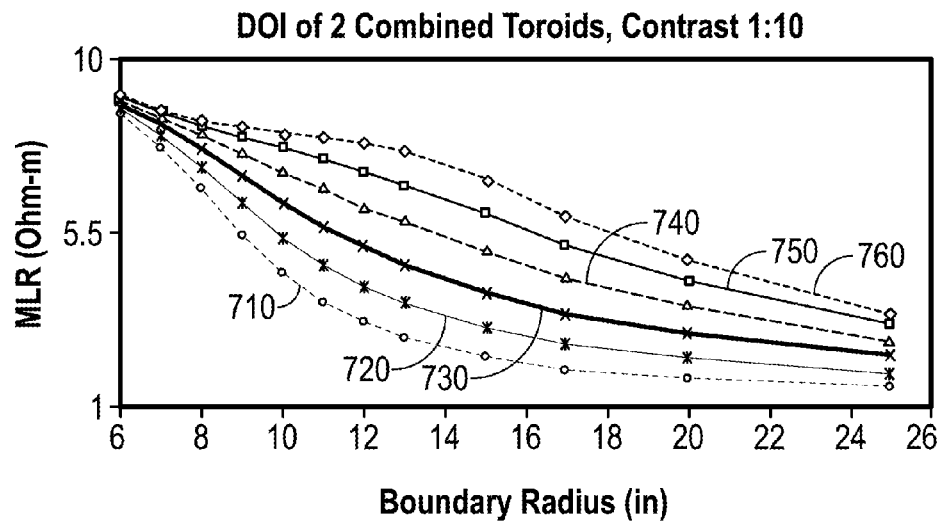
FIG. 7A graphically illustrates the pseudogeometric factor curves for six depths of investigation for a range amplitude contributions for one embodiment according to the present disclosure.
FIG. 7B shows a table of amplitude contributions corresponding to the curves for FIG. 7A.

FIG. 7A shows depths of investigation 710, 720, 730, 740, 750, 760, which have amplitude contributions 715, 725, 735, 745, 755, 765 (FIG. 7B) from transmitter toroid pairs T1, T3. It may be observed that depth of investigation curves 710 and 750 correspond to the normal, uncombined operation of transmitter toroid pairs T1 and T3, respectively. Curves 720, 730, and 740 represent intermediate depths of investigation consistent with formula (1).

In some embodiments, the combined depth of investigation may be outside of the bounds of the inner and outer transmitter pairs. The amplitude contributions of the toroid pairs may be subtracted instead of added. For example, as shown in curve 760 and line 765, the net amplitude contribution is still 100%, however, one toroid pairs' amplitude contribution is negative while the other toroid pairs' contribution exceeds 100%. This condition may be called "overfocusing".

While the foregoing disclosure is directed to the one mode embodiments of the disclosure, various modifications will be apparent to those skilled in the art. It is intended that all variations be embraced by the foregoing disclosure.

We claim:

1. An apparatus for estimating a parameter of interest of an earth formation, comprising:
   a carrier;
   a first transmitter on the carrier;
   a second transmitter on the carrier; and
   a controller in electrical communication with the first transmitter and the second transmitter, the controller being:
     configured to deliver an electrical signal to the first transmitter at a first frequency for a first depth of investigation,
     configured to deliver an electrical signal to the second transmitter at a third frequency for a third depth of investigation, and
     configured to deliver electrical signals to the first transmitter and the second transmitter at a second frequency for a second depth of investigation; the parameter of interest being estimated using signals responsive to electrical signals produced by the first transmitter and the second transmitter for at least three different depths of investigation.

2. The apparatus of claim 1, wherein the first and second transmitters comprise:
   a first transmitter section; and
   a second transmitter section, wherein a receiver toroid on the carrier is positioned between the first transmitter section and the second transmitter section of each of the first transmitter and the second transmitter.

3. The apparatus of claim 2, where the receiver toroid is positioned transversely on the carrier and includes a single coil antenna.

4. The apparatus of claim 1, wherein the controller is further configured to:
deliver the electrical signal for the first depth of investigation and the electrical signal for the third depth of investigation, wherein the electrical signals are delivered one of: simultaneously or sequentially.

5. The apparatus of claim 1, wherein the controller is further configured to deliver the electrical signals for the at least three depths of investigation to the first transmitter and the second transmitter in a range of about 25 Hz to about 250 kHz and the electrical signal to the first transmitter is at least one of: i) the same frequency as the electrical signal to the second transmitter and ii) a different frequency than the electrical signal to the second transmitter.

6. The apparatus of claim 1, wherein at least one of the first and second transmitters comprises a toroid.

7. The apparatus of claim 1, wherein the controller is in physical communication with the carrier.

8. The apparatus of claim 1, wherein the parameter of interest comprises at least one of:
a resistivity property of a layer of the earth formation;
a resistivity property of an invaded zone of the earth formation; or
a thickness of a layer of the earth formation.

9. The apparatus of claim 1, wherein the controller is configured to deliver the electrical signals such that the second depth of investigation as a value between a value of the first depth of investigation and a value of the third depth of investigation.

10. The apparatus of claim 1, wherein at least two of the first frequency, the second frequency, and the third frequency are identical.

11. A method of estimating a parameter of interest of an earth formation comprising:
estimating the parameter of interest using signals responsive to electrical signals produced by a first transmitter and a second transmitter for at least three different depths of investigation, wherein a first signal is produced by the first transmitter at a first frequency for a first depth of investigation, a third signal is produced by the second transmitter at a third frequency for a third depth of investigation, and a second signal is produced by the combination of the first transmitter and the second transmitter at a second frequency for a second depth of investigation.

12. The method of claim 11, further comprising:
positioning a logging tool carrying the first transmitter and the second transmitter in a borehole in the earth formation.

13. The method of claim 11, using, for each of the first transmitter and the second transmitter, a transmitter that comprises:
a first transmitter section; and
a second transmitter section,
wherein a receiver toroid is positioned between the first transmitter section and the second first transmitter section.

14. The method of claim 11, wherein the electrical signal for the first depth of investigation and the electrical signal for the third depth of investigation are delivered one of: simultaneously or sequentially.

15. The method of claim 11, wherein electrical signals produced for the at least three depths of investigation are in the frequency range of about 25 Hz to about 250 kHz and the electrical signal to the first transmitter is at least one of: i) the same frequency as the electrical signal to the second transmitter and ii) a different frequency than the electrical signal to the second transmitter.

16. The method of claim 11, wherein at least one of the first and second transmitters comprises a toroid.

17. The method of claim 11, wherein the parameter of interest comprises at least one of:
a resistivity property of a layer of the earth formation;
a resistivity property of an invaded zone of the earth formation; or
a thickness of a layer of the earth formation.

18. The method of claim 11, wherein a value of the second depth of investigation is between a value of the first depth of investigation and a value of the third depth of investigation.

19. The method of claim 11, wherein at least two of the first frequency, the second frequency, and the third frequency are identical.

* * * * *